(12) United States Patent  
Kukulski et al.

(10) Patent No.: US 8,949,860 B2  
(45) Date of Patent: Feb. 3, 2015

(54) METHODS AND SYSTEMS FOR USING A MOBILE DEVICE FOR APPLICATION INPUT

(75) Inventors: Tim Kukulski, Oakland, CA (US); Remon Tijssen, Mill Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 516 days.

(21) Appl. No.: 12/684,300

(22) Filed: Jan. 8, 2010

(65) Prior Publication Data

US 2014/0289747 A1 Sep. 25, 2014

(51) Int. Cl.  
*G06F 3/00* (2006.01)

(52) U.S. Cl.  
USPC .............................................. 719/319; 710/1

(58) Field of Classification Search  
None  
See application file for complete search history.

(56) References Cited

U.S. PATENT DOCUMENTS

| | | | |
|---|---|---|---|
| 6,393,297 B1 | 5/2002 | Song | |
| 7,576,730 B2 * | 8/2009 | Anwar | 345/173 |
| 8,175,420 B2 * | 5/2012 | Sposato et al. | 382/311 |
| 2006/0161635 A1 * | 7/2006 | Lamkin et al. | 709/217 |
| 2007/0091167 A1 | 4/2007 | Shiina et al. | |
| 2007/0233455 A1 * | 10/2007 | Zimmer et al. | 703/27 |
| 2008/0003993 A1 | 1/2008 | Rye et al. | |

OTHER PUBLICATIONS

Bonjour—Frequently Asked Questions, available at developer.apple.com/networking/bonjour/faq.html (last accessed Nov. 30, 2009).
Mac OS X 10.5 Help—"About screen sharing," available at http://docs.info.apple.com/article.html?path=Mac/10.5/en/14066.html, 2009 (last accessed Feb. 4, 2010).

* cited by examiner

*Primary Examiner* — Kenneth Tang  
(74) *Attorney, Agent, or Firm* — Kilpatrick Townsend & Stockton LLP (57) ABSTRACT

A instance of a runtime environment at each of a first and second computing device can allow an application at the first computing device to access hardware resources of the second computing device via the runtime environment. For instance, one device can comprise a mobile device and the other device can comprise a desktop computer, a laptop computer, or a home entertainment device. The first and second instance of the runtime environment can be configured to communicate with one another through a common messaging format of the runtime environment. For example, an editing or design application at one device may use a touch-enabled display at the second device to select tools, manipulate 3-D representations, or otherwise provide input data. As another example, a game at a mobile device can use the runtime environment to provide visual and audio output using a television set-top box running the runtime environment.

20 Claims, 4 Drawing Sheets

METHODS AND SYSTEMS FOR USING A MOBILE DEVICE FOR APPLICATION INPUT

TECHNICAL FIELD

The disclosure below generally relates to systems and methods for using an input output (I/O) component of a second computing device as source and/or destination of data sent to or from a first computing device.

BACKGROUND

Computing devices continue to proliferate in type and functionality. For example, a typical computer user may have access to a laptop, desktop, or other computer along with one or more mobile devices, such as mobile telephones, personal digital assistants, media players, or multifunction devices. The same user may have access to a home entertainment device, such as a set-top box, media player, or another computing device included in or used in conjunction with a television.

Some or all of the computing devices may support networking connections using wireless and/or wired technology (e.g., IEEE 802.11, Ethernet, etc.). Software applications can, of course, be used to send data between devices. For example, a desktop computer may support remote access from a mobile device via a remote access server application at the desktop computer and a client application at the mobile device.

SUMMARY

Existing systems and methods for sending data between devices often rely on complex or customized solutions, such as particular applications for providing a client/server architecture. Embodiments of the present subject matter can leverage a runtime environment common to a first and second computing device to allow an application at the first computing device to access hardware resources of the second computing device via the runtime environment. In some embodiments, use of such an architecture can allow for faster and more responsive application behavior than could otherwise be achieved. In some embodiments, programming and deployment of applications is greatly simplified as well, and device owners can benefit from the use of I/O components that may not otherwise be available at a given device.

Embodiments include a system comprising a first computing device and a second computing device. For instance, the second computing device can comprise a mobile device and the first computing device can comprise a desktop computer, a laptop computer, or a set-top box. In any event, each computing device can comprise a processor, a memory, a networking component, and an input/output (I/O) component. The first computing device can be configured by program components embodied in the memory to provide a first application and a first instance of a runtime environment. The second computing device can be configured by program components embodied in the memory to provide a second instance of the runtime environment; the second computing device may also feature one or more applications. The first and second computing devices may provide different operating environments—i.e. different hardware architectures and/or different operating systems. The instances of the runtime environments can be tailored to the respective operating environments.

The first and second instance of the runtime environment can be configured to communicate with one another by accessing the networking component of the first and second computing devices. This can allow the first application to be configured to utilize the I/O component of the second computing device by communicating through the instances of the runtime environment. Additionally, any one of a plurality of different types of second devices configured to provide an instance of the runtime environment can be supported. In some embodiments, the first and second instance of the runtime environment are configured to identify one another through a common messaging format of the runtime environment. The runtime environment may support communication between instances of itself without the need for a server to mediate the communication.

In one embodiment, the first application comprises an editing or design application. The second computing device may feature a touch-enabled display that can be used by the design application to select tools, manipulate 3-D representations, or otherwise provide input data. Embodiments also include using the second computing device to provide output. For example, in one embodiment the first computing device comprises a mobile device and the second computing device comprises a home entertainment device such as a set-top box used in or alongside a television and/or other equipment. The first application can comprise a game and the first application can use the runtime environment to provide output (e.g., visual/audio output) using the home entertainment device.

Embodiments also include methods and computer-readable media implementing one or more aspects of the present subject matter. These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Figure 1:
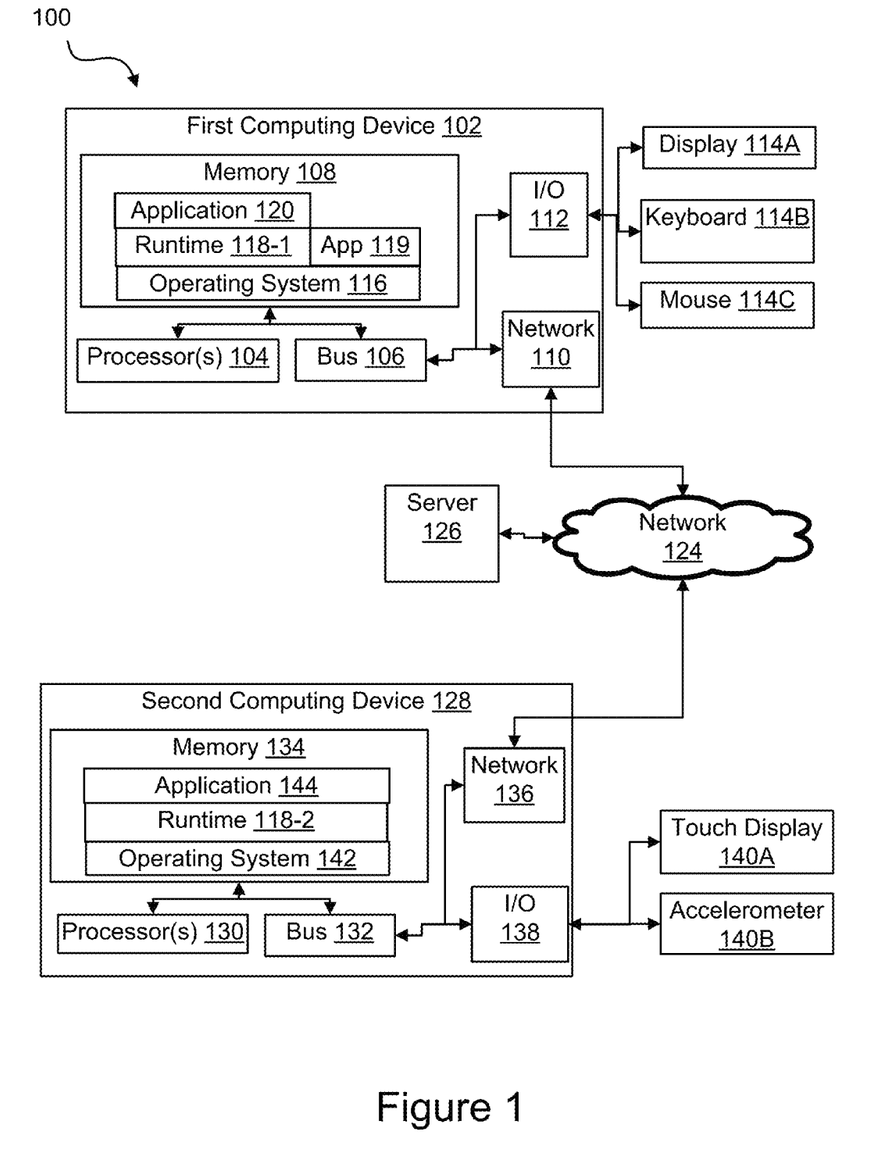
FIG. 1 is a block diagram showing an illustrative system including a first computing device 102 configured to utilize one or more input or output components of a second device.

FIG. 1 is a block diagram showing an illustrative system 100 including a first computing device 102 configured to utilize one or more input or output components ("I/O components" herein) of a second device 128 in accordance with aspects of the present subject matter. In this example, first computing device 102 comprises one or more processors 104, a tangible, non-transitory computer-readable medium (memory 108), a networking component 110, and several I/O components 114 linked to processor 104 via I/O interface(s) 112 and bus 106.

For example, memory 108 may comprise RAM, ROM, or other memory accessible by processor 104. I/O interface 112 can comprise a graphics interface (e.g., VGA, HDMI) to which display 114A is connected, along with a USB or other interface to which keyboard 114B and mouse 114C are connected. Networking component 110 may comprise an interface for communicating via wired or wireless communication, such as via Ethernet, IEEE 802.11 (Wi-Fi), 802.16(Wi-Max), Bluetooth, infrared, and the like. As another example, networking component 110 may allow for communication over communication networks, such as CDMA, GSM, UMTS, or other cellular communication networks.

Computing device 102 is configured by program components embodied in the memory to provide a first instance 118-1 of a runtime environment 118 and a plurality of applications. Runtime environment 118 may, for example, comprise the Adobe® Flash® or AIR® environment available from Adobe Systems Incorporated of San Jose, Calif. or another runtime environment. In this example, runtime environment 118-1 and an application 119 run within an operating environment provided by operating system 116. An application 120 utilizes runtime environment 118-1. Either or both applications 119 and 120 can utilize runtime environment 118-1 to access hardware resources of second computing device 128 via a suitable connection.

In this example, second computing device 128 comprises a processor 130, a memory 134, a networking component 136, and a plurality of input/output (I/O) components 140 connected via I/O interface(s) 138 and bus 132. The second computing device is configured by program components embodied in the memory to provide a second instance of the runtime environment. Particularly, device 128 features an operating system 142 in which a second instance 118-2 of runtime environment 118 is executing. In this example, a second application 144 is executed using runtime environment 118-2. Device 128 may feature a different hardware architecture, operating system, or other configuration resulting in an operating environment that differs from device 102. In such a case, each computing device can utilize an instance of runtime environment 118 tailored to its operating environment.

In this example, the first and second instance of the runtime environment 118 are configured to communicate with one another by accessing the networking component 110 of the first computing device and the networking component 136 of the second computing device to connect via network 124. Network 124 may represent a direct connection between the devices or an indirect connection.

For example, if both devices support Bluetooth or Wi-Fi, then the devices may connect to one another by forming a local network. If a network already exists, the devices may communicate with one another via the existing network, such as via one or more access points. As another example, the devices may connect with one another via a wide-area network (e.g., the Internet) and/or multiple networks, such as by using a cellular or other wireless communications network linked to the Internet. Server 126 is shown to represent one or more server computing devices that may be used for internetworking, although embodiments do not necessarily need a server to facilitate a connection.

In this example, first computing device 102 features a display, keyboard, and mouse. However, it may be desirable for application 120 to be configured to support input from I/O elements such as touch display 140A and accelerometer 140B and/or to provide additional output via display 140A. As a particular example, application 119 or 120 may comprise a design application, such as Adobe® Photoshop®, that supports design and rendering of three-dimensional (3D) objects. A user with only a mouse or other pointing device may need to switch between use of the mouse for providing commands related to tool selection/use and commands related to changing the orientation of the 3-D object.

In accordance with the present subject matter, the first application 119 or 120 (in this example, Photoshop®), is configured to utilize the I/O component(s) 140 of second computing device 128 by communicating through the instances 118-1 and 118-2 of the runtime environment. For example, touch display 140A and/or accelerometer 140B may be relied upon by application 119/120 to reposition/reorient the 3-D object or view thereof. Rather than using on a customized client and server application at the respective devices to package data for relay via the network, application 119/120 can be configured to utilize the capabilities of runtime environment 118-1 to communicate with instance 118-2 and access touch display 140A and accelerometer 140B.

As another example, other types of input from multiple different devices can be used in a design or other application. For example, in a vector graphics editing application (such as Adobe® Illustrator®), a curve may be defined in terms of a points on the curve and handles used to control the curvature. An input device interfaced to a computing device may allow for input to adjust a point and its handles at the same time, and/or to change multiple points at the same time. For instance, a mouse may be used to move one point and a touch screen interfaced/comprised in a separate device may be used to move the other point.

As a further example, an editing application may allow for commands such as scaling, moving, and rotating onscreen objects (e.g., 2D objects, 3D objects, container boundaries, page margins, etc.). An input device interfaced to a first computing system can be used to move an object while input from a device interfaced to a second system can be used to simultaneously rotate/scale the object.

Some design tools provide a "clone" tool which can be used to duplicate content specified at a first point or area (source point) based on input designating a second point or area (clone brushing). Rather than requiring a user to switch between the source and brush using a single input device, a first input device (e.g., touchscreen) can be used to designate the source point while a second input device (e.g. pen tablet) interfaced to a separate computing system can be used to apply the clone brush.

More than two I/O devices may be supported by an application, of course. For instance, a user may utilize a first I/O device interfaced to a first computing system, a second I/O device interfaced to a second computing system, and a third I/O device interfaced to either the first or second systems or interfaced to a third computing system. More than one user may collaborate as well. For example, an application executed using a first computing device may receive input and/or provide output via I/O devices of the first computing device and used by one user and also I/O devices of one or more other computing devices associated with or used by other users.

In some embodiments, runtime environment 118 supports a common messaging format along with programmatic methods to discover other instances of itself and exchange methods without the need to rely on a central server to coordinate messaging between instances. For example, the instances of the runtime environment can expose an application programming interface (API) that allows use of the messaging capability to facilitate access of remote resources at the hardware level.

Each instance of the runtime environment can be considered a node in a network. The runtime environment can support discovery of other nodes across devices or even across networks for applications to relay data to one another. The runtime environment may be configured to provide data exchange with very low latency, which may not be possible if a non-runtime-based method were used.

Applications such as application 120 that are written for use in the runtime environment can access remote resources by including appropriate function calls and event handlers for utilizing capabilities of the runtime environment as exposed by the API. In some embodiments, the API supports communication with applications outside the runtime environment, so applications such as application 119 may utilize the capabilities of runtime environment 118. For example, the runtime environment may package data into a scripting action for an application that is not running within the runtime.

A corresponding application 144 at device 128 may be used to expose hardware capabilities, but in some embodiments no programming apart from the instance of the runtime environment 118 is needed to expose I/O components 140 for remote access. Application 144 may, however, be used to provide enhanced functionality. For example, customized interface elements may be defined by application 144 and can be populated based on data relayed from application 120.

In this example, I/O components of the first and/or second computing devices comprise a display, keyboard, mouse/pointer, touch display, and accelerometer. Other examples of I/O components include a global positioning sensor (GPS), a compass, a still camera, a video camera, a microphone, a speaker, a gyroscope, a scanner, a printer, a thermometer, and a barcode reader. It will be understood that these examples are not intended to be limiting and any other suitable I/O components used to generate output at the device based on data signals and/or convert input to data signals can be used in embodiments of the present subject matter.

Figure 2A:
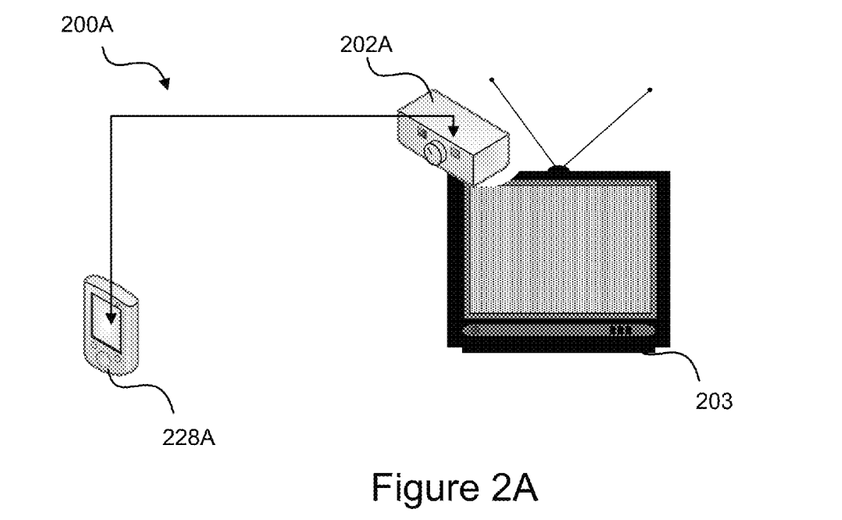
FIGS. 2A and 2B each illustrate an exemplary architecture utilizing embodiments of the present subject matter.
Figure 2B:
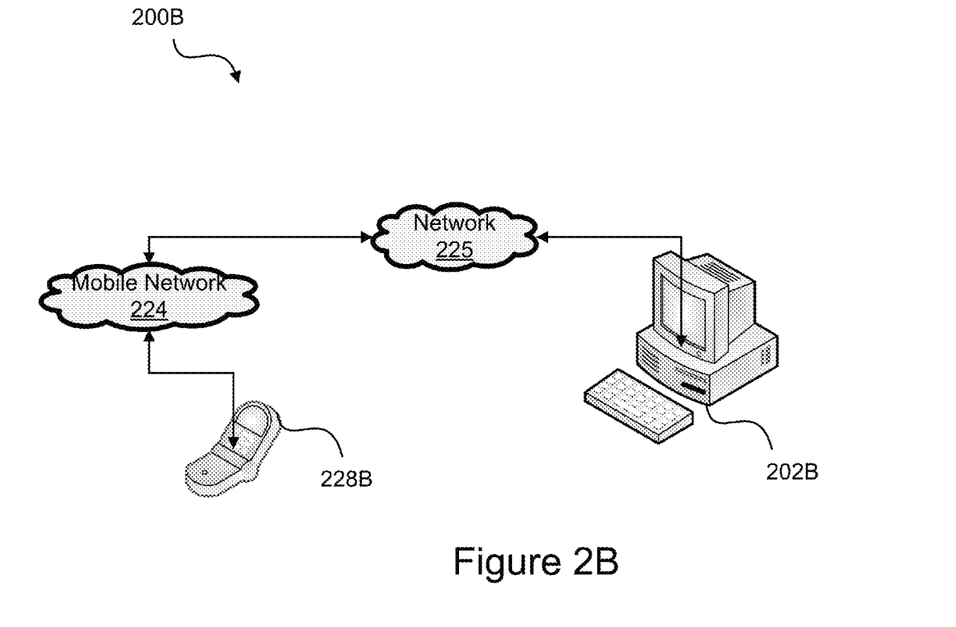

FIGS. 2A and 2B each illustrate an exemplary architecture utilizing embodiments of the present subject matter. In FIG. 2A, architecture 200A features a first computing device comprising a home entertainment device 202A and a second computing device 228A comprising a mobile device. In this example, home entertainment device 202A comprises a set-top box interfaced to a television. For instance, home entertainment device 202A may comprise a DVD player, digital video recorder (DVR), media center computer, cable box, game system, or another device used to select and play content via television 203. In this example, device 202A is illustrated as separate from television 203, but it will be understood that functionality of a home entertainment device may be integrated into a television.

Home entertainment device 202A may access one or more hardware resources of mobile device 228A to receive input data or provide output data, and vice-versa. For example, mobile device 228A may comprise a mobile phone, PDA, portable media player, portable gaming system, or other suitable device equipped with a touch screen, accelerometer, and/or other I/O components. Both devices 202A and 228A may run an instance of a runtime environment such as Adobe® Flash®.

Home entertainment device 202A may execute an application that provides output for television 203 and supports channel selection, video playback commands, and/or other input using the touch screen or accelerometer of device 228A. As another example, a game executed on device 202A may utilize the runtime environment to use the screen and accelerometer of mobile device 228A for input during the game and/or to output effects during the course of the game.

The roles of devices 202A and 228A could be reversed. For instance, mobile device 228A may execute an application such as a game and utilize the output capabilities of device 202A/television 203 to provide visual and audio output beyond the capabilities of mobile device 228A.

FIG. 2B illustrates an example in which the first computing device comprises a desktop, server, laptop, or other computer 202B and the second device 228B comprises a mobile phone. In this example, mobile phone 228B is connected to a mobile network 224 in communication with a wide-area network 225 by which computing device 202B can be reached.

As an example, a user may design a web page or application using an application executed by computing device 202B. During the design, the user may provide additional input via components of device 228B, such as an accelerometer, keypad, or the like. For instance, a user may utilize a web design application to design and edit a plurality of web pages using device 202B. The web design application can be configured to use the runtime environment to communicate with device 228B and access hardware resources thereof.

As the user browses to the pages on device 228B, device 228B can relay the browse commands to the web design application at device 202B in order to update which page is shown in the design view. If the user saves an updated version of a particular page, the web design application at device 202B can send a message via the runtime environment for device 228B to update the page currently shown on device 228B. As a further example, the web design application may utilize the runtime environment to send the entire page to device 228 for viewing directly.

In both FIGS. 2A-2B, a single pair of devices is shown. However, embodiments of the present subject matter can allow for an application utilize the I/O component of any one of a plurality of different types of second devices, each type of second device configured to provide an instance of the runtime environment. For example, the runtime environment API may expose "generic" I/O devices such as touchscreens, accelerometers, speakers, microphones, screens, and the like so that a developer of an application need not include code for accessing specific device types. Instead, the runtime environment can handle the device-level hardware differences.

Figure 3:
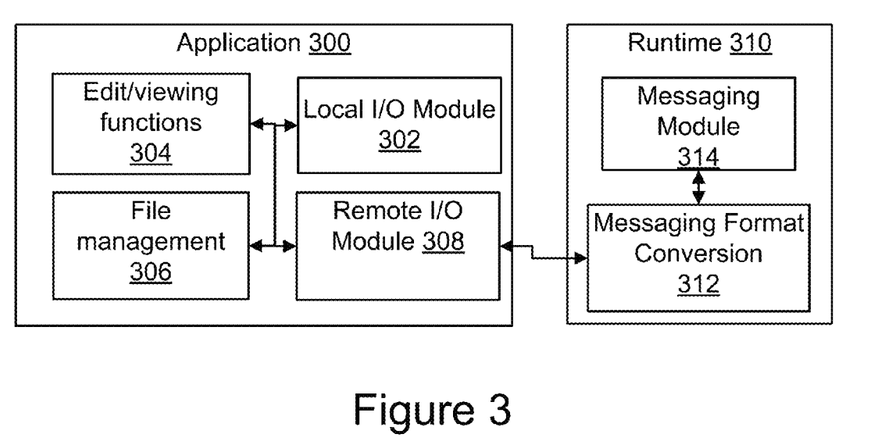
FIG. 3 is a block diagram showing an exemplary software architecture of an application and a runtime environment.

FIG. 3 is a block diagram showing an exemplary software architecture of an application 300 and a runtime environment 310. This example is not meant to exhaustively detail the functionality of an application or runtime environment that should be known to one of skill in the art, but instead provides examples of components that can be used to implement embodiments of the present subject matter.

Application 300 comprises a local I/O module 302, which can comprise software components that generate visual, audio, and other output at a local device. For example, I/O module 302 may define a graphical user interface comprising various elements such as buttons, sliders, input fields, and objects that display video, still images, and other content. Local I/O module 302 may rely on input from local hardware and generate appropriate signals or commands to provide the graphical user interface and/or other output locally using a display, speakers, and the like. In practice, local I/O module may utilize runtime environment 310 for hardware-level tasks.

Edit/viewing functions 304 are shown to generally illustrate programming of application 300 that controls various states of the application. For example, controls in the graphical user interface can be linked to logic included in edit/viewing functions 304 to play back and control content of a video, select a portion of a document for display in a window and create scrolling effects, and/or manipulate data based on input received via the graphical user interface. File management 306 may represent software components that handle reading and storing files from memory, accessing data from remote servers, and otherwise moving data into and out of application 300.

Remote I/O module 308 is included to represent software components of application 300 that rely on hardware resources of one or more devices separate from the device executing application 300. In some embodiments, the hardware resources are made available via runtime environment 310. As was mentioned above, application 300 may be executing within runtime environment 310, and so other aspects of application 300 may be implemented via function calls to the runtime environment.

In accordance with the present subject matter, application 300 can utilize runtime environment 310 in order to send data to or receive data from remote hardware resources. In this example, runtime environment 310 includes messaging format conversion functionality 312 that converts data as handled internally to application 300 (e.g., instances of classes) to a format supported by runtime environment 310 for data exchange. For instance, runtime environment 310 may communicate via a common messaging format recognized by other instances of itself via messaging module 314. As messages are received, format conversion module 312 can convert the messages into suitable objects or other logical structures recognized by the software components of application 300. Similarly, as application 300 generates data for output or other commands, the data/commands can be converted into the messaging format for routing to one or more remote devices.

Messaging module 314 represents one or more software components of runtime environment 310 that handle setting up and managing links between instances of the runtime environment. In some embodiments, runtime environment 310 uses messaging module 314 to support multicasting of events to various instances of the runtime environment on the same network subnet. This may allow for low latency in messaging between application 300 and the other device(s). However, messaging module 314 may utilize networking capabilities of the runtime environment for other types of communications. For example, communications outside the subnet can be supported using any suitable transport protocol. Messaging module 314 may also include support for authentication and other security measures to avoid unauthorized use of hardware resources.

For example, in some embodiments, the runtime environment provides network APIs that allow for ad-hoc application communication without an intervening server via multicast events. An application using the APIs may additionally use an external server to provide for more robust discovery of application nodes, but as mentioned previously a server is not needed in all embodiments. For example, the runtime environment may send multicast events to discover other instances of the runtime environment (i.e. other nodes). Once the nodes have been identified, UDP and TCP/IP socket communications can be used to allow for high bandwidth, low-latency point-to-point communications between nodes.

When a packet of data is received by a node (e.g., by the runtime on a particular computing device), an appropriate event handler can be called within the runtime application. The event handler may repackage the data into a user-level event or a scripting session for relay to an application not running within the runtime. Additionally or alternatively, the event handler of the runtime environment may directly control the state of the application in the runtime based on the event. Similarly, an application not running within the runtime can use scripting or another method to send data to the runtime in order to generate an event at one or more other nodes. An application in the runtime can do the same by generating an internal event or otherwise invoking the API of the runtime environment.

Figure 4:
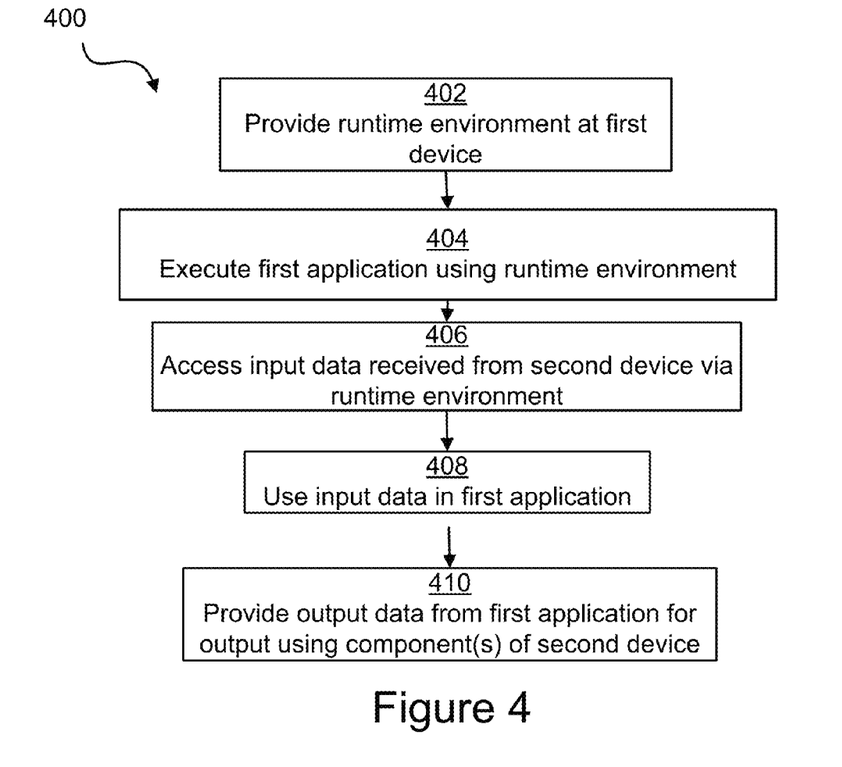
FIG. 4 is a flowchart showing an exemplary method for providing inter-device access to hardware resources.

FIG. 4 is a flowchart showing an exemplary method 400 for providing inter-device access to I/O resources. Block 402 represents providing a runtime environment at a first computing device. For example, an instance of a runtime environment can be configured to support access to hardware resources of the first computing device via the device's operating system. As another example, the runtime environment may be configured to access some hardware resources directly.

Block 404 represents executing a first application using the runtime environment. For example, an application can be configured to rely on an API exposed by the runtime environment to launch the application by allocating memory space to program code defining the application and to execute logic defined by the application to generate a user interface, store data, receive input, and manipulate data in the form of one or more objects in memory.

Block 406 represents accessing input data received from a second device via the runtime environment. For example, the application may be configured to access data available from the runtime environment and indicating available hardware resources from other devices apart from the computing device executing the application. The runtime environment may, for example, establish connections with other instances of itself and maintain a working list of available hardware resources such as displays, speakers, microphones, keyboards/keypads, touch-sensitive surfaces, accelerometers, mice/pointing devices, GPS receivers, compasses, and other hardware devices. The application can include conditional logic for utilizing one or more remote devices if indicated to be available via the runtime environment.

Block 408 represents using input data from a remotely-accessible hardware resource in the application. For example, the application may include logic indicating that, if a touch screen is available, the touch screen should be utilized for coordinate inputs. As a particular example, the touch screen coordinates may be used as an input in logic of the application that changes a view or orientation of a 3-D object. If the runtime environment indicates that a touch screen is available, the application can read a software object containing the coordinates. As another example, the runtime environment may send an event to the application indicating when the touch screen has registered a touch, and the event may include the coordinate data.

Block 410 represents providing output data for output using one or more components of the second device. For example, the application may determine from the runtime environment that a large-screen display is available on the local subnet. The application can provide a command as set forth in the API to display screen content. For example, the application may direct a video stream for output using the screen.

In this example, blocks 408 and 410 are both shown. In some embodiments, an application may rely on a second device for input only or for output only. As another example, an application at a first computing device may rely on an I/O component of a second device for input and an I/O component of a third device for output. Other permutations of using devices for input and output are possible as well.

Figure 5:
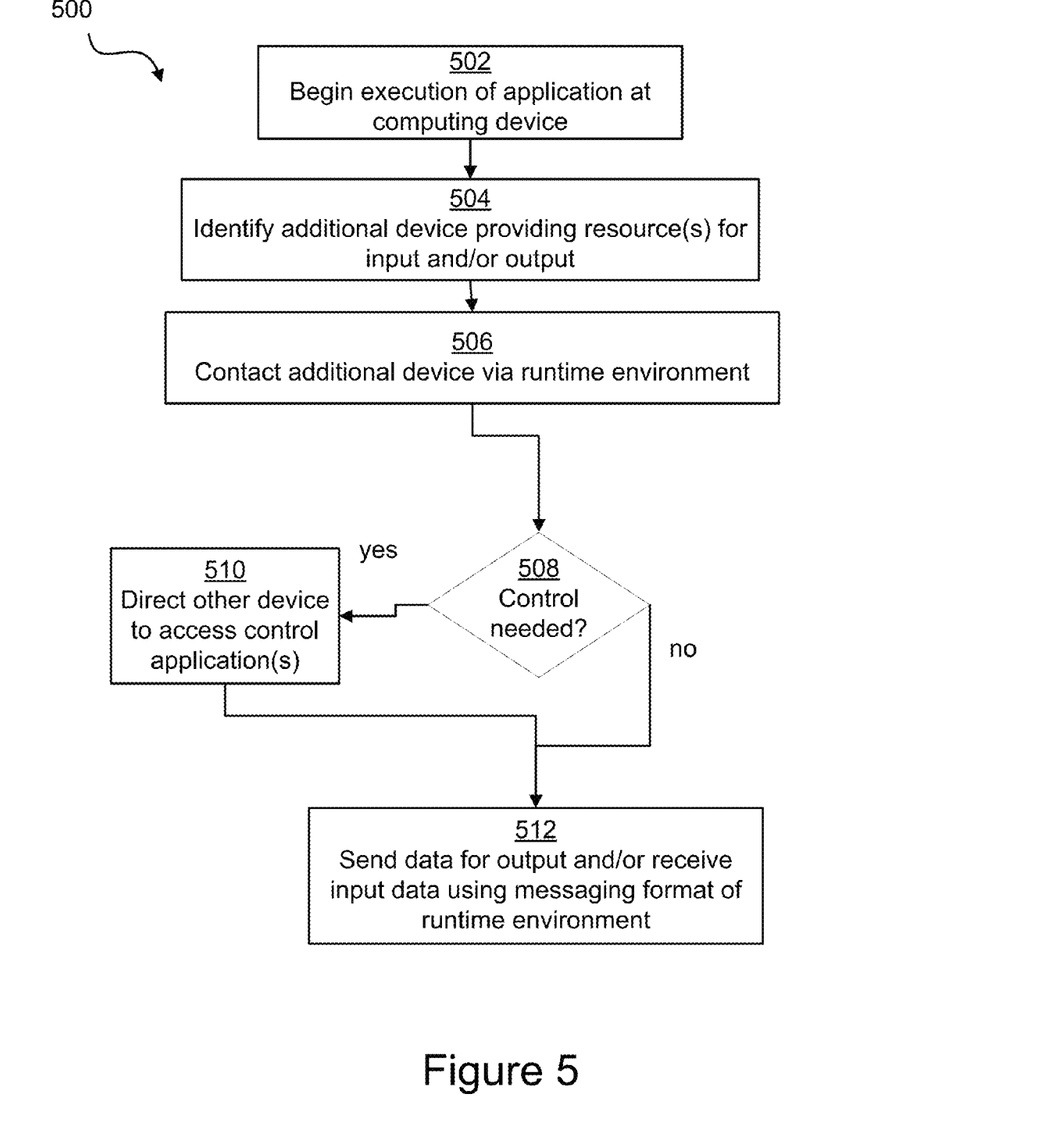
FIG. 5 is a flowchart showing steps in an exemplary method for utilizing a second device for input/output purposes.

FIG. 5 is a flowchart showing steps in an exemplary method 500 for utilizing a second device for I/O purposes. Block 502 represents beginning execution of an application at a first computing device. For instance, as was noted above, an application can be loaded using a runtime environment and program flow of the application can begin. Block 504 represents identifying one or more additional devices providing resources for I/O purposes. As was noted above, the runtime environment may identify a list of available resources.

In this example, the application is configured to utilize a control at the second computing device. As mentioned previously, in some embodiments a second device does not require additional software beyond the runtime environment in order to make I/O resources available. For instance, accelerometers, touch screens, microphones, and the like may simply be available for access directly from the runtime environment, though of course the runtime environment may support authentication or user access controls limiting which I/O components are made available.

However, in some embodiments, use of an application at the second computing device may enhance the user experience. For instance, a control application may be used to present a graphical user interface at the second device similar in appearance/organization to a graphical user interface of the first computing device. As another example, the application at the second computing device may provide a preview of content under design in an application at the first computing device, but without any UI clutter. As a further example, the control application may pre-process certain data and then relay the data to the first application via the runtime environment. For example, the control application may recognize a gesture at the second computing device and relay a gesture ID code to avoid sending a plurality of messages to the first computing device for use by the first application in recognizing the gesture.

Block 508 represents determining if a control application is needed. If so, then at block 510, the first application directs the second computing device to access the control(s). For example, if the runtime environment comprises Adobe® Flash® or Air®, the control may comprise a SWF or AIR file available from the first computing device or a remote server.

Block 512 represents sending data for output and/or receiving input data using the runtime environment to pass information between the first and second computing devices. The downloaded control can be used at the second computing device, with the first application processing received data and/or providing data for output, such as receiving input gestures and other information and/or generating output effects for display or other output via the control at the second device.

GENERAL CONSIDERATIONS

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, portable music players, and consumer electronic devices such as cameras, camcorders, and mobile devices. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments. In some embodiments, optimal performance is achieved using a mix of pull and push data, with the use of broadcast/multicast as noted above.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method comprising:
   executing, at a first computing device, a first instance of a runtime environment;
   executing, at the first computing device, an application configured to utilize input data via a first input device of the first computing device and to utilize additional input data obtained by the first instance of the runtime environment;
   identifying, by the first computing device, a second instance of the runtime environment contemporaneously executing at a second computing device and providing access to a second input device of the second computing device;
   obtaining, by the first computing device, the additional input data received by the second input device by communicating a function call of an application programming interface between the first instance and the second instance of the runtime environment, wherein the application programming interface is provided by the runtime environment and is configured for accessing the second input device, wherein the function call comprises a command for the second instance of the runtime environment to directly communicate with a hardware component of the second input device; and
   utilizing, by the application executed at the first computing device, the input data received by the first input device and the additional input data received by the second input device.

2. The method of claim 1,
   wherein identifying the second instance of the runtime environment comprises identifying that the second computing device and the first computing device are accessing a common subnet;
   wherein the function call is communicated between the first instance and the second instance of the runtime environment via the common subnet.

3. The method of claim 1, wherein the function call comprises a command for the second instance of the runtime environment to communicate with the second input device via an operating system of the second computing device.

4. The method of claim 1, wherein identifying the second instance of the runtime environment comprises determining that data communicated by the second computing device is formatted according to a common messaging format of the runtime environment.

5. The method of claim 1, wherein communicating the function call comprises the first instance of the runtime environment formatting the function call according to a common messaging format of the runtime environment for communication to the second instance of the runtime environment.

6. The method of claim 5, wherein utilizing the additional input data received by the second input device comprises:
   receiving the additional input data in the common messaging format;
   converting the additional input data from the common messaging format to a format compatible with an additional application programming interface of the application;
   executing an additional function call of the additional application programming interface that is specified by the additional input data.

7. The method of claim 1, wherein the application is configured to utilize both the input data and the additional input data as commands to an interface provided by the application.

8. The method of claim 1, wherein the first input device has a first input device type and the second input device has a second input device type different from the first input device type and not available via the first computing device.

9. The method of claim 8, wherein the second input device comprises a mouse, wherein mouse-based input is not available via the first input device.

10. The method of claim 1, further comprising establishing, by the first computing device, a local network including the first computing device and the second computing device prior to identifying the second instance of the runtime environment contemporaneously executing at the second computing device.

11. The method of claim 1, further comprising:
generating, by the application executing at the first computing device, first output data for display at a first display device and second output data for display at a second display device of the second computing device;
identifying, by the first computing device, the second display device of the second computing device, wherein the second display device is accessible via the second instance of the runtime environment; and
providing, by the first computing device, the first output data to the first display device and providing the second output data to the second display device via an additional function call of the application programming interface communicated between the first instance and the second instance of the runtime environment, wherein the application programming interface is further configured for accessing the second display device.

12. The method of claim 1, wherein the function call is communicated between the first instance and the second instance of the runtime environment without coordination of the communication by a server system separate from the first computing device and the second computing device.

13. The method of claim 1,
wherein the first computing device comprises a home entertainment device interfaced to a display device and the second computing device comprises a mobile device;
wherein executing the application configured to utilize input data comprises executing an application controlling programming content displayed via the display device;
wherein obtaining the additional input data received by the second input device comprises obtaining the additional input data generated by at least one of a touch screen function and an accelerometer function provided by the mobile device;
wherein utilizing the additional input data received by the second input device comprises utilizing the additional input data to modify at least one attribute of the programming content displayed via the display device.

14. The method of claim 13, wherein the at least one attribute comprises at least one of a channel selection and a video playback command.

15. The method of claim 13, further comprising:
obtaining, by the home entertainment device, output data generated by an additional application executed at the mobile device by communicating a function call of the application programming interface between the first instance and the second instance of the runtime environment; and
utilizing, by the home entertainment device, the output data to modify the programming content based on the output data generated by the mobile device.

16. The method of claim 15, wherein the additional application comprises a gaming application and the output data comprises at least one of video data or audio data that is unplayable at the mobile device.

17. A method comprising:
providing, at a first computing device, a first instance of a runtime environment;
executing, at the first computing device, an application configured to receive input data via a first input device of the first computing device and to receive additional input data via the first instance of the runtime environment;
identifying, by the first computing device, a second instance of the runtime environment contemporaneously executing at a second computing device;
obtaining, by the first computing device, the additional input data received by a second input device of the second computing device, wherein the additional input data is communicated in a common messaging format of the runtime environment between the first instance and the second instance of the runtime environment;
converting the additional input data from the common messaging format to a format compatible with an application programming interface of the application;
utilizing, by the application executed at the first computing device, a first function call of the application programming interface that is specified by the input data received by the first input device; and
utilizing, by the application executed at the first computing device, a second function call of the application programming interface that is specified by the additional input data received by the second input device, wherein the second function call comprises a command for the second instance of the runtime environment to directly communicate with a hardware component of the second input device.

18. A computer program product comprising a non-transitory computer-readable medium embodying program code executable by a computing system, the program code comprising:
program code for executing, at a first computing device, a first instance of a runtime environment;
program code for executing, at the first computing device, an application configured to utilize input data via a first input device of the first computing device and to utilize additional input data obtained by the first instance of the runtime environment;
program code for identifying, by the first computing device, a second instance of the runtime environment contemporaneously executing at a second computing device and providing access to a second input device of the second computing device;
program code for obtaining, by the first computing device, the additional input data received by the second input device by communicating a function call of an application programming interface between the first instance and the second instance of the runtime environment, wherein the application programming interface is provided by the runtime environment and is configured for accessing the second input device, wherein the function call comprises a command for the second instance of the runtime environment to directly communicate with a hardware component of the second input device; and
program code for utilizing, by the application executed at the first computing device, the input data received by the first input device and the additional input data received by the second input device.

19. The computer program product of claim 18, wherein the function call comprises a command for the second instance of the runtime environment to communicate with the second input device via an operating system of the second computing device.

20. The computer program product of claim 18, further comprising:
program code for generating, by the application executing at the first computing device, first output data for display at a first display device and second output data for display at a second display device of the second computing device;

program code for identifying, by the first computing device, the second display device of the second computing device, wherein the second display device is accessible via the second instance of the runtime environment; and program code for providing, by the first computing device, the first output data to the first display device and providing the second output data to the second display device via an additional function call of the application programming interface communicated between the first instance and the second instance of the runtime environment, wherein the application programming interface is further configured for accessing the second display device.

* * * * *